US008667410B2

(12) United States Patent
Schacht

(10) Patent No.: US 8,667,410 B2
(45) Date of Patent: Mar. 4, 2014

(54) METHOD, SYSTEM AND COMPUTER PROGRAM PRODUCT FOR TRANSMITTING DATA FROM A DOCUMENT APPLICATION TO A DATA APPLICATION

(75) Inventor: Johannes Schacht, Konstanz (DE)

(73) Assignee: Open Text S.A., Luxembourg (LU)

( * ) Notice: Subject to any disclaimer, the term of this patent is extended or adjusted under 35 U.S.C. 154(b) by 1264 days.

(21) Appl. No.: 11/917,882

(22) PCT Filed: Jul. 4, 2006

(86) PCT No.: PCT/EP2006/063845
§ 371 (c)(1),
(2), (4) Date: Dec. 19, 2007

(87) PCT Pub. No.: WO2007/006687
PCT Pub. Date: Jan. 18, 2007

(65) Prior Publication Data
US 2008/0195968 A1 Aug. 14, 2008

(30) Foreign Application Priority Data
Jul. 8, 2005 (DE) .......................... 10 2005 032 046

(51) Int. Cl.
*G06F 3/048* (2013.01)
(52) U.S. Cl.
USPC ........... 715/769; 715/221; 715/224; 715/226; 715/764; 382/176; 382/177
(58) Field of Classification Search
USPC .......... 382/176, 177; 715/221, 224, 226, 764, 715/769
See application file for complete search history.

(56) References Cited

U.S. PATENT DOCUMENTS

| 5,448,375 | A | | 9/1995 | Cooper et al. | |
|---|---|---|---|---|---|
| 5,594,809 | A | * | 1/1997 | Kopec et al. | 382/161 |
| 5,680,223 | A | * | 10/1997 | Cooper et al. | 358/403 |
| 5,689,620 | A | * | 11/1997 | Kopec et al. | 706/12 |
| 5,835,712 | A | * | 11/1998 | DuFresne | 709/203 |
| 6,529,217 | B1 | * | 3/2003 | Maguire et al. | 715/769 |

(Continued)

FOREIGN PATENT DOCUMENTS

| EP | 1 510 962 | 3/2005 |
|---|---|---|
| WO | WO 2005/043452 | 5/2005 |

OTHER PUBLICATIONS

English translation of the specification of WO 2005/043452, dated Dec. 17, 2007.*

(Continued)

*Primary Examiner* — Steven Sax
*Assistant Examiner* — David Choi
(74) *Attorney, Agent, or Firm* — Sprinkle IP Law Group

(57) ABSTRACT

In a method for computer-aided transfer of data from a document application into a data application having a set of data fields, a document is displayed in the document application opened on a computer with a display device, and wherein from the document data are to be transferred into the data application also opened on the computer. A name of a data field into which data are to be transferred is displayed on the display device. Via identification of a corresponding data value in the document on the display device, a character string representing the data value is automatically read out from the document and entered into the data field corresponding to the data field name in the data application via actuation of a predetermined button.

20 Claims, 5 Drawing Sheets

(56) References Cited

U.S. PATENT DOCUMENTS

| | | | |
|---|---|---|---|
| 7,668,372 B2* | 2/2010 | Schiehlen | 382/176 |
| 2002/0141660 A1* | 10/2002 | Bellavita et al. | 382/309 |
| 2004/0205526 A1* | 10/2004 | Borodovski et al. | 715/505 |
| 2005/0041860 A1* | 2/2005 | Jager | 382/173 |
| 2005/0198563 A1* | 9/2005 | Kristjansson | 715/507 |
| 2006/0059247 A1* | 3/2006 | Marappan et al. | 709/219 |
| 2007/0065011 A1* | 3/2007 | Schiehlen | 382/181 |
| 2008/0195968 A1* | 8/2008 | Schacht | 715/799 |

OTHER PUBLICATIONS

XP-002399735—"Single Click Entry" das neue Tool von Oce Document Technologies macht Nachbearbeitung von Dokumenten noch schneller—2004.

OCE Document Technologies XP-002399736 DOKuStar Produktfamilie—2004.

XP-002399747 Single Click Entry Oder Wie Die Maus in Der Datenerfassung Salonfähig Wird—Version 1.2—Jan. 2005.

Oce Document Technologies—XP-002399738—Feb. 18, 2005.

\* cited by examiner

METHOD, SYSTEM AND COMPUTER PROGRAM PRODUCT FOR TRANSMITTING DATA FROM A DOCUMENT APPLICATION TO A DATA APPLICATION

CROSS-REFERENCE TO RELATED APPLICATION(S)

This application is a U.S. National Phase of International Application No. PCT/EP2006/063845 filed on Jul 4, 2006, entitled METHOD, SYSTEM AND COMPUTER PROGRAM PRODUCT FOR TRANSMITTING DATA FROM A DOCUMENT APPLICATION TO A DATA APPLICATION, which application is hereby incorporated by reference in its entirety.

BACKGROUND

The preferred embodiment concerns a method and a system for transfer of data from a document application into a data application.

In daily office work forms must often be filled with data. For the most part the data originate from documents. These data contained in the documents are often entered by hand into data fields of the form. For this purpose, the form and the document are simultaneously presented on a computer screen. In the event that the computer screen should not possess a sufficient size, the document containing the data is also often printed out and the data are transcribed from the printed copy into the form. In the event that the document exists as an electronic text file it is also possible to use the "copy+paste" function provided by prevalent operating systems, with which function a data value in a document can be marked, copied and inserted into the data format of an electronic form. These known methods are very work-intensive since either all data must be manually input or a user must continuously switch back and forth between a document application in which the document is presented and a data application in which the form is displayed. This simple activity is thus time-consuming and ties up significant productivity in tasks that could be used for more worthwhile activities.

In order to automate this activity, wholly automatic data recognition systems have been developed with which large quantities of documents are automatically read in, the data contained therein are extracted and the data are entered into databanks.

Such a system for acquisition of data arises from WO 2005/043452 A1. In this system templates must be generated according to which the corresponding regions in the document are automatically located, from which documents the data are read out and imported into the databank. In this system incorrectly read data sets are corrected by hand. This system is characterized in that the existing templates are automatically corrected using the manual corrections or new templates are automatically generated using the manual corrections.

In these wholly automatic systems, in which the documents are automatically imported, data are automatically extracted and the extracted data are automatically entered into a databank (insofar as no corrections are necessary). These systems are provided for "big industry" use, i.e. for production conditions of standardized workflows or documents.

Outside of the copy+paste function explained above, for the regular data acquisition from documents (for which such wholly automatic systems are not worthwhile) there are no means that support the data acquisition of data contained in documents, whereby the documents are displayed in document applications on a computer screen and the data contained therein are to be transferred into data applications.

SUMMARY

It is an object to achieve a method and a system for transfer of data from a document application into a data application, with which method and system the data can be transferred significantly more quickly and simply than with the known copy+paste function.

In a method for computer-aided transfer of data from a document application into a data application having a set of data fields, a document is displayed in the document application opened on a computer with a display device, and wherein from the document data are to be transferred into the data application also opened on the computer. A name of a data field into which data are to be transferred is displayed on the display device. Via identification of a corresponding data value in the document on the display device, a character string representing the data value is automatically read out from the document and entered into the data field corresponding to the data field name in the data application via actuation of a predetermined button.

DESCRIPTION OF THE PREFERRED EMBODIMENT

Figure 1:
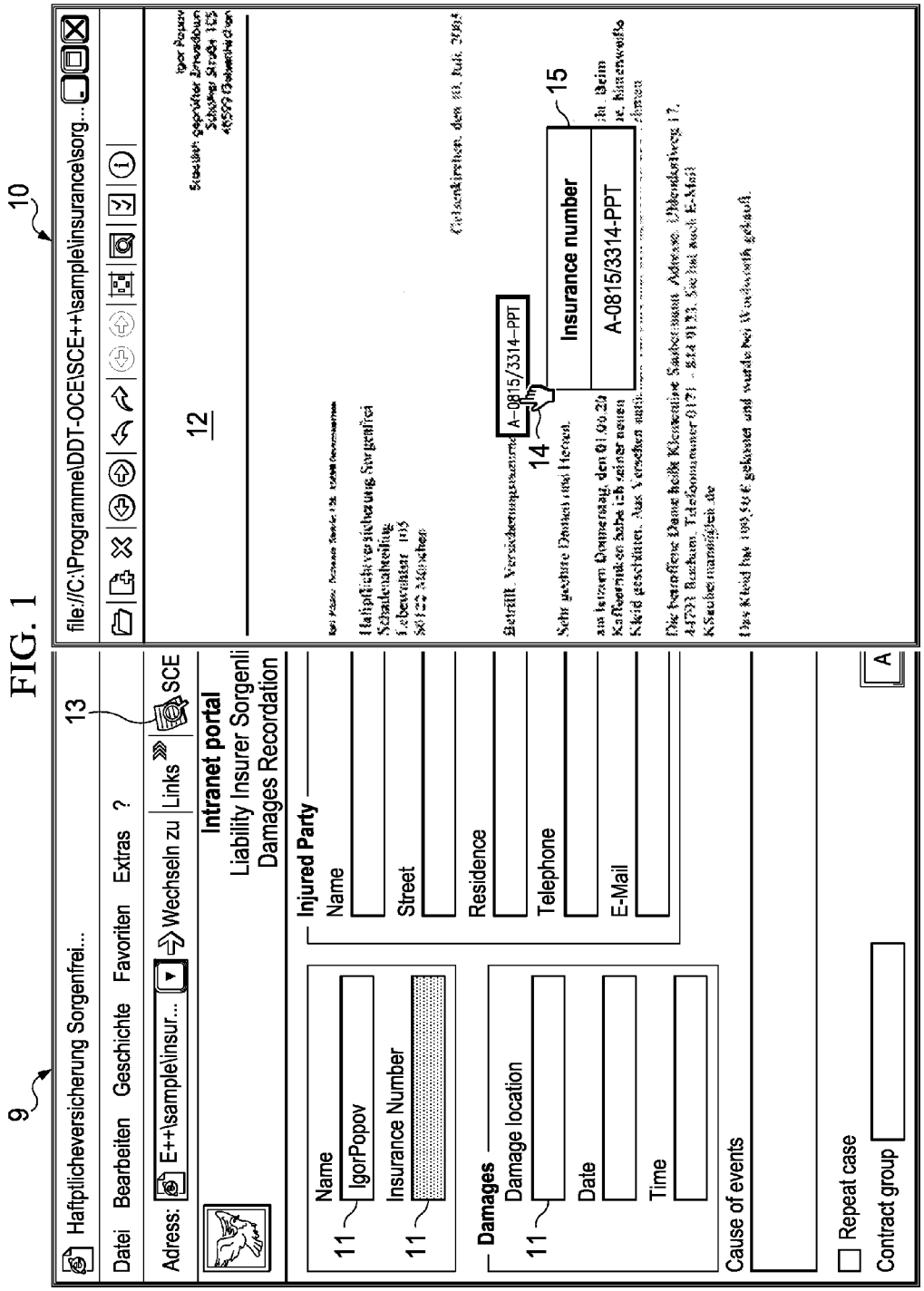
FIG. 1 is a screen presentation of a document application and a data application, whereby the method of the preferred embodiment for transferring data from the document application to the data application is executed.

For the purposes of promoting an understanding of the principles of the invention, reference will now be made to the preferred embodiment/best mode illustrated in the drawings and specific language will be used to describe the same. It will nevertheless be understood that no limitation of the scope of the invention is thereby intended, and such alterations and further modifications in the illustrated device and such further applications of the principles of the invention as illustrated as would normally occur to one skilled in the art to which the invention relates are included.

The method of the preferred embodiment serves for computer-aided transfer of data from a document application opened on a computer into a data application opened on a computer.

In the method the name of the data field for which data are to be transferred is displayed, and a system is provided with which, via identification of a corresponding data value in the document on the display device, the character string representing the data value is automatically read out from the document and entered into the data field corresponding to the data field name in the data application via actuation of a predetermined button.

The name of the next data field to be read out is hereupon advantageously displayed, and the method is repeated until data have been transferred into each data field of a data set of the data application.

A significant advantage of the method relative to the known copy+paste function lies in that the document application and the data application do not have to be switched back and forth between to transfer the data; rather, the transfer can be executed solely in the document application in that the data transfer occurs merely via identification of the data value to be read out and via actuation of a predetermined button. Forms in data applications can thus be filled out quickly. This is in particular enabled in that an intelligent connection module (in particular designed as a computer program) is provided between the document application and the data application, with which connection module the user is simultaneously directed through the document displayed in the document application and through the data fields of the data application. This module furthermore in particular enables the corresponding data field names to be displayed at a data field of the data application on the display device, an identified character string in the displayed document to be automatically read out and (in particular after the actuation of a predetermined button) this character string to be entered into the data field of the data application corresponding to the data field name.

The method can be realized as an independent computer program, however it can also be integrated into existing document applications or data applications, and is run-capable on a small personal computer, such that it is not necessary to provide a significantly more expensive and more complex, wholly automatic data acquisition system.

The character string read out from the document is advantageously displayed (in particular enlarged) on the display device so that the user can check the character string before it is released for entry into the data application via actuation of the button.

According to a further preferred embodiment, that character string that is located between two space characters is determined as the character string to be read out, or a specific data type available for the data field is considered and the character string is correspondingly defined. Typical data types are date specifications, amounts (as occur on bills), location designations (including postal code, street designations) and time specifications. Such data types can also comprise space characters.

According to a further preferred embodiment, a character string read out and to be transferred is standardized, i.e. is converted corresponding to a predetermined format and is entered in the standardized into the data application. If the data application comprises a plurality of data sets, the data contained in the individual data fields are then respectively entered in the same format, which makes the later processing of the stored data easier.

The system for transferring data from a document application into a data application advantageously comprises a configuration routine for configuration of the data transfer. With the configuration routine, data field names are associated with data fields of the data application. Specific data types can in turn be assigned to these data field names. This configuration routine be is designed to automatically read data fields of a data application, whereby the data fields are recognized either using a specific data field structure or using demarcation lines of data fields in a graphical input mask.

The method serves for transferring data from a document application into a data application.

Figure 6:
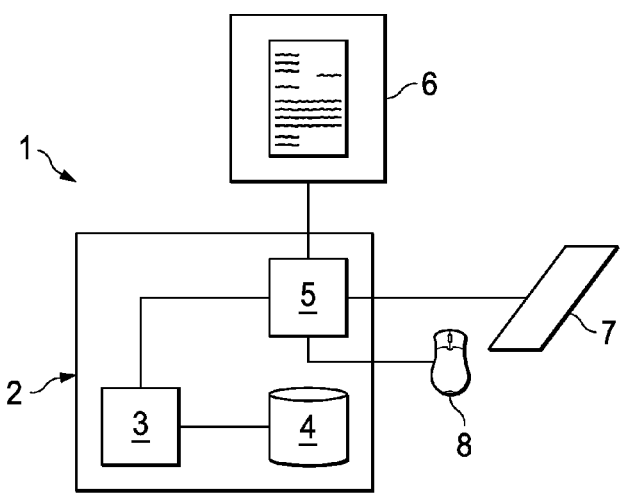
FIG. 6 shows in a schematically simplified fashion, a system for execution of the method of the preferred embodiment.

The method is executed on a computer system 1 as it is shown in FIG. 6, for example. This computer system 1 comprises a computer 2 with a central computation unit (CPU), a memory device 4 (for example hard disk) and an interface 5. A display device 6 (screen) and input devices in the form of a keyboard 7 and a computer mouse 8 are connected at the interface 5. This computer system 1 is typically a commercially available personal computer.

A data application 9 and a document application 10 are executed on the computer (FIG. 1). A document application is any computer program with which a document can be presented on a display device of a computer (such as, for example, a computer screen). The document can exist in the form of a text file (Word document, rtf document, txt document, e-mail etc.) or in the form of a graphic file (pdf document, tiff document etc.). A data application is any computer program upon whose execution data values can be entered. Typical data applications are databanks and table calculation programs. However, data applications can also be files in a meta-language (such as, for example, html) that contain fields for entry of the data.

Separate memory regions at the computer 2 are associated with both the document application and the data application, in which memory regions are stored the data processed by the respective application. Specific data values selectable by the user should thus be transferred from the memory region of the document application into the memory region of the data application in a simple manner with the preferred embodiment.

Shown in FIG. 1 as an exemplary preferred embodiment is a data application in the form of an Internet browser in which an intranet page of the liability insurer Sorgenfrei is called up, in which page is contained a form for damage recording. This form comprises data fields 11 in which the individual data values of a document 12 shown in the document application 10 are to be entered. The document 12 is a letter to the insurer in which damages are communicated. In the present example, the method is realized as a computer program that is integrated into the data application 9 and there is started by means of a mouse click on an icon 13. This icon is designated with SCE, which is the abbreviation for Single Click Entry™. The method is started via actuation of the icon 13 (step S1 in FIG. 5). A window 15 is hereupon appended to the cursor 14, which window 15 is moved together with the cursor. A data field name is displayed in the window (S2). In FIG. 1 the data field name is the "insurance number".

The cursor 14 is moved into the area of the insurance number contained in the document, whereby the character string representing the insurance number is identified or is detected by the program (S3).

Which characters belong to this character string is now automatically determined (S4). This determination normally occurs in that the character string is determined that is located between two space characters. If a specific data type is defined for a data field for which a data value is to be read out from the document, the determination of the characters belonging to the character string occurs using this data type. Such data types are, for example, date specifications, amounts (as they occur on bills), location designations (including the postal code, street designations), time specifications, telephone numbers and e-mail addresses. This determination becomes more reliable via the use of data types or data formats for determination of the character string in step S4.

The character string so determined is marked in color in document 12 and read out, i.e. read from the memory region that is associated with the document application. The read-out character string is displayed below the data field name in window 15. This is particularly advantageous when the document 12 exists in the form of a graphic file and the read-out character string occurs based on an automatic character recognition method (OCR method) since all characters cannot always be recognized. The character string shown in window 15 can then be manually corrected by means of the keyboard 7. If the character string marked in document 12 or shown in window 15 is too long or too short, this can be corrected via corresponding inputs on the keyboard, or with the mouse it is also possible to draw a frame around a character string selected by the user, which selected character string is then read out in step S5 and presented in the window 15. However, this correction function is only necessary in the exceptional case for readout of a character string whose data type is not defined and that contains one or more space characters, or for importation of a free text containing multiple words and/or lines. The identification of the data value (S3), the determination of the character string (S4) and the readout of the character string (S5) typically occurs solely via movement of the cursor 14 into the area of the corresponding character string.

If the character string read-out and displayed in the window 15 is correct, the importation of the character string into the corresponding data field 11 in the data application 9 is executed via actuation of a button (S6). This character string is hereby stored in the memory region of the data application. This can occur in that the character string itself or its memory address is passed to the data application or copied into this, whereby a corresponding linking with the associated data field 11 occurs.

It is accordingly checked whether a further data value is to be imported (S7) in order to enter data into all data fields of a data set of the data application. If this is the case, the method workflow passes again to the step S2.

If no further data value is to be imported, the method is ended with the step S8.

Figure 5:
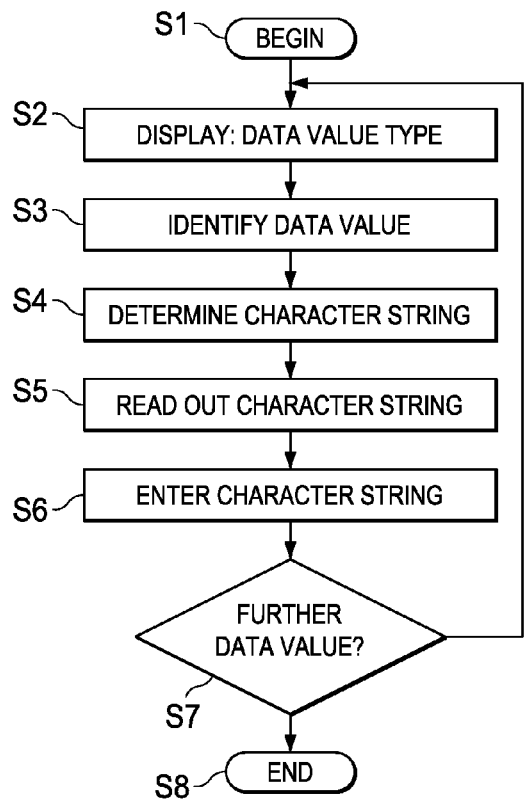
FIG. 5 shows the method of the preferred embodiment in a flow chart.

The computer program comprises all steps of the method shown in FIG. 5. It is stored on the computer 2 and is executed there. The computer program can also be stored on a data medium in order to be transferred to another computer, for example.

Both the data application 9 and the document application 10 are presented for explanation in FIG. 1. However, for usage of the method it is not necessary that both applications 9, 10 are simultaneously presented on the screen 6. If the method has been started once, it is sufficient when solely the document application 10 is shown on the screen, since the individual data values can be transferred into the data application 9 with the method without the data application 9 having to be shown on the screen for this. In the document application 10 the cursor 14 is hereby merely moved into the region of the corresponding data values and the transfer of the read-out character string is then executed via actuation of the corresponding button.

The exemplary embodiment explained above can be expanded via further features and method steps.

For example, when in step S2 a data field name is displayed and a format or data type is associated with this data field name, it is appropriate to mark all character strings in the document 12 that correspond to this data type. The location of the corresponding character strings for identification of the data values is hereby made easier for the operator.

In a further preferred embodiment, the character string read out in step S5 is formatted according to a predetermined data application format and is displayed in this formatted form in the window 15 and then entered into the data application in step S6. The data application format does not have to coincide with the data type described above for determination of the character string in step S4. The data type used in step S4 can comprise a plurality of different formats (such as, for example, diverse formats for representation of a date specification, for example with or without the month written out) as they can occur in document 12. All possible data formats or data types are to be taken into account in the determination of the character string to be read out.

Contrary to this, the data application format is a definite format that allows no variations and serves to ensure that the character string entered into the data application 9 with regard to a specified data value corresponds exactly to this data format. The entries into the data application regarding specific data values or in specific data fields are hereby always formatted identically, which significantly simplifies the later processing of the data so stored. The read-out character string is advantageously also presented in window 15 in this presentation normalized to the data application format, such that the user sees in which form the character string is transferred.

In the exemplary embodiment shown in FIG. 1 the document 12 is based on a graphic file, namely a tiff file. So that the data values can be read from this file, this graphic file is initially automatically converted into a text file by means of an automatic character recognition (OCR method) upon loading of said graphic file or upon starting of the method. In the present exemplary embodiment the graphic file and not the text file is shown, whereby the two files are connected such that, given identification of a data value in the graphic file, a virtual identification of the corresponding character string occurs in the corresponding text file, whereby the readout of the character string then occurs from the text file. However, after the automatic character recognition it is also possible to present the document 12 in a document application using the text file hereby generated.

Given documents that innately exist as a text file (for example MS Word file, rtf file, txt file, e-mail etc.), a preparation by means of an automatic character recognition is naturally not necessary.

Figure 2:
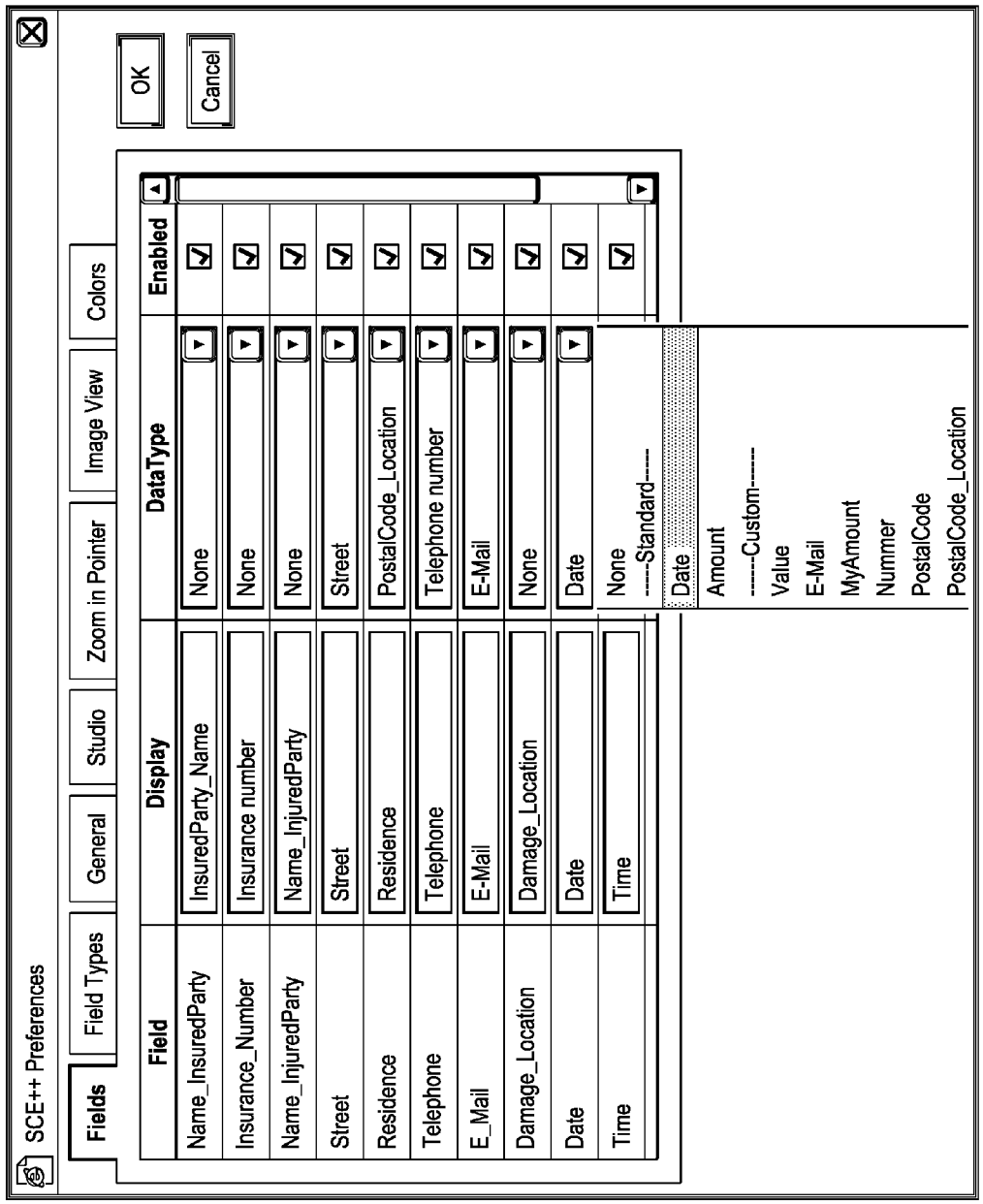
FIG. 2 is a configuration table.

The system also comprises a configuration routine for configuration of the data transfer from the document application 10 to the data application 9. The core element of the configuration routine is a table (FIG. 2) that comprises all data fields of a data set of the data application in the first column (Field), the designation of the data field names in a second column (Display) and the data type in a third column (Data type). The data field names and the data types can be configured by the user, whereby the data field names can be freely varied. The data types can be selected from a list of data types. This list is shown in the corresponding field for data in FIG. 2. Standard formats (Standard) and also independently generated data types (Custom) can be selected herein.

In a further, fourth column (enabled), the individual data fields are activated or deactivated in that a check mark is set or not set. Only at the activated data fields are data values read out and transferred into the data application 9 in the method. These activated data fields thus represent the set of predetermined data fields in which data are entered from the document application with the method.

Figure 3:
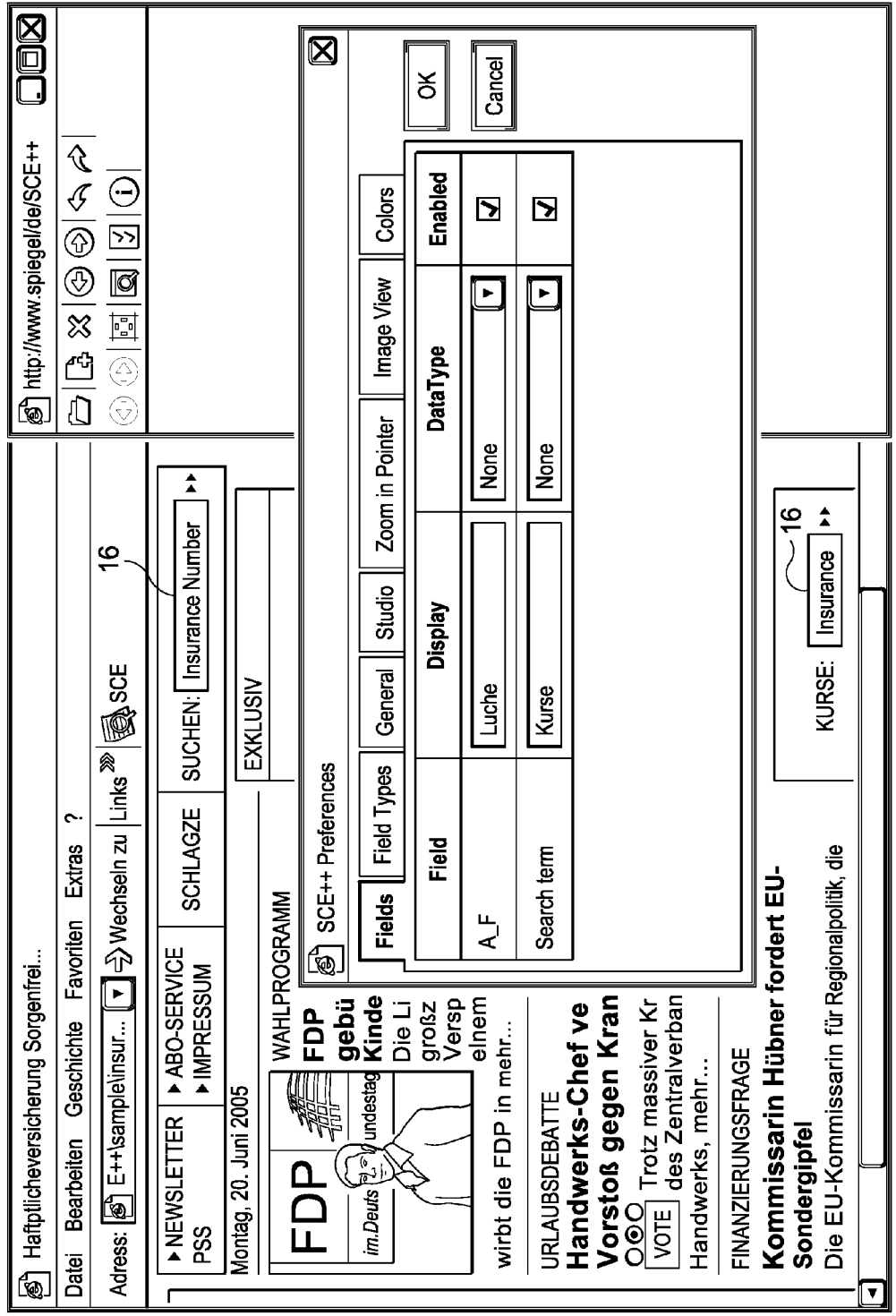
FIG. 3 is a screen presentation of a document application and a data application together with a corresponding configuration table.

The generation of such a configuration table normally occurs with a routine that analyzes the data structure of a specific data application and determines the corresponding data fields. Shown in FIG. 3 as a data application is an Internet browser in which a specific home page has been called up, in which home page two data fields 16 are given. The file defined by the home page (here: html file) is read by the routine and examined for corresponding data fields. The data fields "A_F" and "search term" have hereby been determined. As is explained above, the data field names and the data types can be correspondingly configured with the table.

Figure 4:
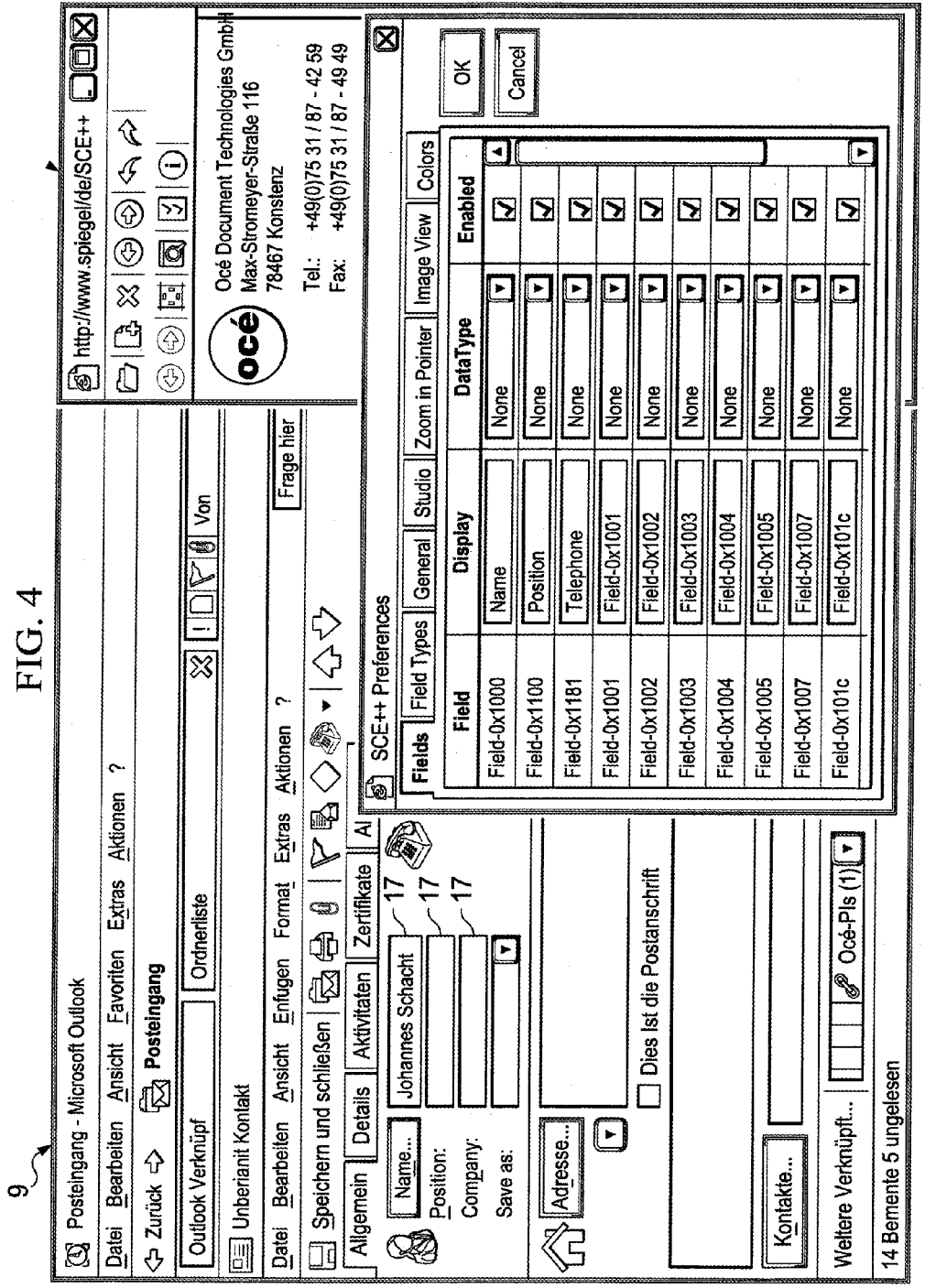
FIG. 4 is a screen presentation of a document application and a data application together with a corresponding configuration table.

Such data structures can be automatically read and generated by standardized data applications such as html pages, databanks, table calculation programs. However, there are also non-standardized data applications or data applications for which an automatic analysis of the data fields is not provided. In order to be able to also use the method given such data applications, an alternative routine for generation of the configuration table is provided in which a graphical input mask or form of the data application is analyzed. The demarcation lines of the individual data fields 17 (FIG. 4) are hereby automatically detected. A designation is generated for each data field (for example field 0x1000). One line is placed in the configuration file for each data field. This line is linked with the data field of the data application 9. An e-mail program (namely Microsoft Outlook®) is depicted in FIG. 4 as a data application. The data field names that are to be read from the document application can then again be configured with the configuration table so generated.

This configuration is so simple that it can be executed by a user without detailed programming or information knowledge. A sufficiently large list of data types is merely to be provided so that the data transfer from the document application into the data application functions well. Most data types can be detected with standard formats.

The preferred embodiment is in particular suited to be realized as a computer program (software). It can therewith be disseminated as a computer program module, as a file on a data medium (such as a diskette, CD-ROM, DVD) or as a file via a data or communication network. Such and comparable computer program products or computer program elements are embodiments of the invention. The workflow can in particular be applied in a computer or in a computer network. It is thereby clear that corresponding computers on which the preferred embodiment is applied can comprise further known technical devices such as, for example, input units (keyboard, mouse, touchscreen), a microprocessor, a data or control bus, a display device (monitor, display) as well as a working memory, a hard disk storage and a network card.

The preferred embodiment can be briefly summarized according to the following:

A method and a system is provided for transfer of data from a document application in a data application. A data value in a document is hereby identified by a user, for example in that a cursor is moved into the proximity of the data value. The character string representing this data value is then automatically established and read out. The user can transfer the data value into the data application merely via actuation of a button. Further data values are similarly read out. The transfer of the data values can be implemented entirely in the document application. Since the individual data values must only be identified and a transfer must subsequently be initiated via a button actuation, the transfer of the data values occurs very quickly, whereby significant working time is saved in comparison to conventional methods.

While a preferred embodiment has been illustrated and described in detail in the drawings and foregoing description, the same is to be considered as illustrative and not restrictive in character, it being understood that only the preferred embodiment has been shown and described and that all changes and modifications that come within the spirit of the invention both now or in the future are desired to be protected.

I claim as my invention:

1. A method for computer-aided transfer of document data from a document application into a data application having a set of data fields, comprising the steps of:

displaying, on a display device by a processor of a computer executing instructions embodied on a non-transitory computer readable medium, a document in the document application opened on the computer, wherein the document contains said document data to be transferred into the data application which is also opened on the computer;

in response to user activation of an integrated single click entry functionality of the data application, the integrated single click entry functionality of the data application appending a window to a cursor displaying on the display device, the window having a name of a data field in the data application into which said document data from the document opened in the document application are to be transferred, the window being moveable with and adjacent to the cursor on the document in the document application;

identifying, by the integrated single click entry functionality of the data application, a corresponding data value in the document on the display device where the cursor is positioned in the document application, wherein the identifying occurs solely and automatically by movement of the cursor and wherein information displayed in the window changes with the movement of the cursor;

automatically reading out, by the integrated single click entry functionality of the data application from a memory region associated with the document application, a character string representing the data value in the document, the data application and the document application associated with separate memory regions at the computer;

displaying, by the integrated single click entry functionality of the data application, the character string in the window appended to the cursor; and importing the character string into the data field in the data application via actuation of a predetermined button.

2. A method according to claim 1 wherein the steps of displaying a name and automatically reading out the character string are repeated until corresponding data have been transferred into all data fields of a set.

3. A method according to claim 1 wherein the character string located between two space characters is automatically selected for readout in the identification of the data value from the document, or a specific data type predetermined for the data field name is considered and a correspondingly identified character string is automatically selected.

4. A method according to claim 3 wherein the character string automatically selected upon identification is corrected.

5. A method according to claim 1 wherein a data field name of a further data field of a data set of the data application is displayed after the character string is imported into the data application.

6. A method according to claim 1 wherein all character strings that correspond to the data type of the data field corresponding to the displayed data field name are marked in the displayed document insofar as a specific data type is associated with the data field.

7. A method according to claim 1 wherein the character string is standardized according to a predetermined data application format before it is entered into the data application.

8. A method according to claim 1 wherein the displayed document exists as a graphic file and is converted into a text file by an automatic character recognition routine.

9. A system for transfer of data from a document application into a data application having a set of data fields, comprising:

a computer with a central computation unit;
a memory device;
a display device;
an input device; and
a computer program configured to be run on said computer and stored in said memory device for performing the steps of:

displaying, on the display device, a document in the document application opened on said computer, wherein said the document contains document data to be transferred into the data application also opened on the computer;

in response to user activation of an integrated single click entry functionality of the data application, the integrated single click entry functionality of the data application appending a window to a cursor displaying on the display device, the window having a name of a data field in the data application into which data from the document opened in the document application are to be transferred, the window being moveable with and adjacent to the cursor on the document in the document application;

identifying, by the integrated single click entry functionality of the data application, a corresponding data value in the document on the display device where the cursor is positioned in the document application, wherein the identifying occurs solely and automatically by movement of the cursor and wherein information displayed in the window changes with the movement of the cursor;

automatically reading out, by the integrated single click entry functionality of the data application, from a memory region associated with the document application, a character string representing the data value in the document, the data application and the document application associated with separate memory regions at the computer;

displaying, by the integrated single click entry functionality of the data application, the character string in the window appended to the cursor; and importing the character string into the data field in the data application via actuation of a predetermined button.

10. A system according to claim 9 further comprising a configuration routine for configuration of the data transfer from the document application to the data application, whereby the configuration routine comprises a system for definition of data field names, for association of the data field names with data fields in the data application, and for assignment of specific data types to the defined data field names.

11. A system according to claim 10 further comprising a routine for the definition of the data field names that automatically reads the data fields of the data application and generates a list of the data field names.

12. A system according to claim 11 wherein the data fields are detected using a specific data field structure.

13. A system according to claim 11 wherein the data fields are detected in a graphical input mask using demarcation lines of data fields.

14. A non-transitory computer-readable medium comprising a computer program for computer-aided transfer of data from a document application into a data application having a set of data fields, said computer program performing the steps of:

displaying, on a display device, a document in the document application opened on the computer, wherein said document contains document data to be transferred into the data application also opened on the computer;

in response to user activation of an integrated single click entry functionality of the data application, the integrated single click entry functionality of the data application appending a window to a cursor displaying on the display device, the window having a name of a data field in the data application into which data from the document opened in the document application are to be transferred, the window being moveable with and adjacent to the cursor on the document in the data application;

identifying, by the integrated single click entry functionality of the data application, a corresponding data value in the document on the display device where the cursor is positioned in the document application, wherein the identifying occurs solely and automatically by movement of the cursor and wherein information displayed in the window changes with the movement of the cursor;

automatically reading out, by the integrated single click entry functionality of the data application, from a memory region associated with the document application, a character string representing the data value in the document, the data application and the document application associated with separate memory regions at the computer;

displaying, by the integrated single click entry functionality of the data application, the character string in the window appended to the cursor; and importing the character string into the data field in the data application via actuation of a predetermined button.

15. A method for computer-aided transfer of selected data from a document application into a data application having a set of data fields, comprising the steps of:

displaying on a display device a document in the document application opened on a computer;

in response to activation of an integrated single click entry functionality of the data application, the integrated single click entry functionality of the data application appending a window to a cursor and displaying within the window on the display device a name of a data field in the data application into which the selected data from the document application are to be transferred;

positioning a cursor on the display device, in an area of data in the document which corresponds to said data field name, said data field name being displayed in a window moveable with and adjacent to said cursor, wherein said selected data is identified and displayed in the window solely and automatically by movement of said cursor into said area and wherein information displayed in the window changes with the movement of said cursor;

automatically reading out from a memory region associated with the document application a character string as said selected data corresponding to said data field name, the data application and the document application associated with separate memory regions at the computer, the character string displayed in the window appended to the cursor; and entering the character string into the data field corresponding to the data field name in the data application via actuation of a predetermined button.

16. The non-transitory computer-readable medium of claim 14 wherein the steps of displaying a name and automatically reading out the character string are repeated until corresponding data have been transferred into all data fields of a set.

17. The non-transitory computer-readable medium of claim 14 wherein the character string located between two space characters is automatically selected for readout in the identification of the data value from the document, or a specific data type predetermined for the data field name is considered and a correspondingly identified character string is automatically selected.

18. The non-transitory computer-readable medium of claim 17 wherein the character string automatically selected upon identification is corrected.

19. The non-transitory computer-readable medium of claim 14 wherein a data field name of a further data field of a data set of the data application is displayed after the character string is imported into the data application.

20. The non-transitory computer-readable medium of claim 14 wherein all character strings that correspond to the data type of the data field corresponding to the displayed data field name are marked in the displayed document insofar as a specific data type is associated with the data field.

* * * * *